United States Patent [19]
Folco et al.

[11] Patent Number: 4,559,122
[45] Date of Patent: Dec. 17, 1985

[54] CONTINUOUS-CYCLE ELECTROPLATING PLANT

[75] Inventors: Luciano Folco, Via Cal de Guà 5, Montecchio Maggiore (Province of Vicenza); Cirillo S. Reniero, Arbizzano, both of Italy

[73] Assignee: Luciano Folco, Montecchio Maggiore, Italy

[21] Appl. No.: 665,835

[22] Filed: Oct. 29, 1984

[30] Foreign Application Priority Data

Nov. 7, 1983 [IT] Italy ............................. 84974 A/83
Nov. 7, 1983 [IT] Italy ............................. 84975 A/83

[51] Int. Cl.⁴ .......................................... C25D 17/20
[52] U.S. Cl. ................................................ 204/201
[58] Field of Search ..................... 204/198, 199, 201

[56] References Cited

U.S. PATENT DOCUMENTS

| 784,034 | 3/1905 | Clough | 204/201 |
| 1,912,400 | 6/1933 | O'Neill | 204/201 |
| 4,427,518 | 1/1984 | de Vries | 204/201 |

FOREIGN PATENT DOCUMENTS

| 45-32604 | 10/1970 | Japan | 204/201 |
| 647471 | 12/1950 | United Kingdom | 204/201 |

Primary Examiner—T. M. Tufariello
Attorney, Agent, or Firm—Guido Modiano; Albert Josif

[57] ABSTRACT

A continuous-cycle electroplating plant for a plating loose metal items, the plant including a multiplicity of sequentially arranged processing units which comprise at least one pre-treating unit, one or more electroplating units and at least one passivating or coloring unit. Each processing unit comprises a barrel mounted for rotation on a support structure, a spiral rigid with, and extending along and around, the inner side wall of the barrel. Thus, the spiral acts, in use, as a spiral conveyor for moving the metal items from an inlet end of the barrel to its outlet end, and treating means such as a liquid solution for processing the metal items while being moved in the barrel.

3 Claims, 8 Drawing Figures

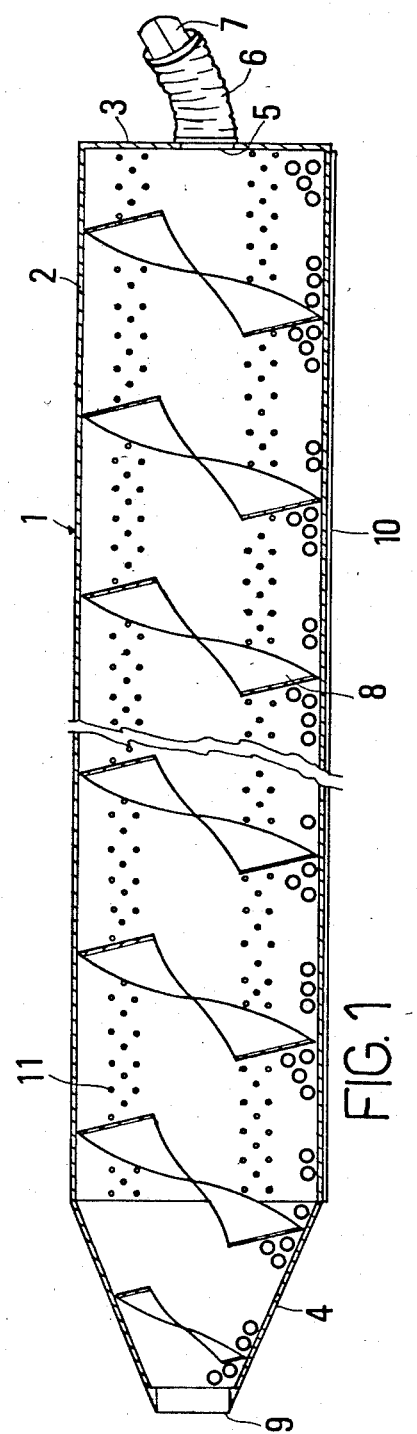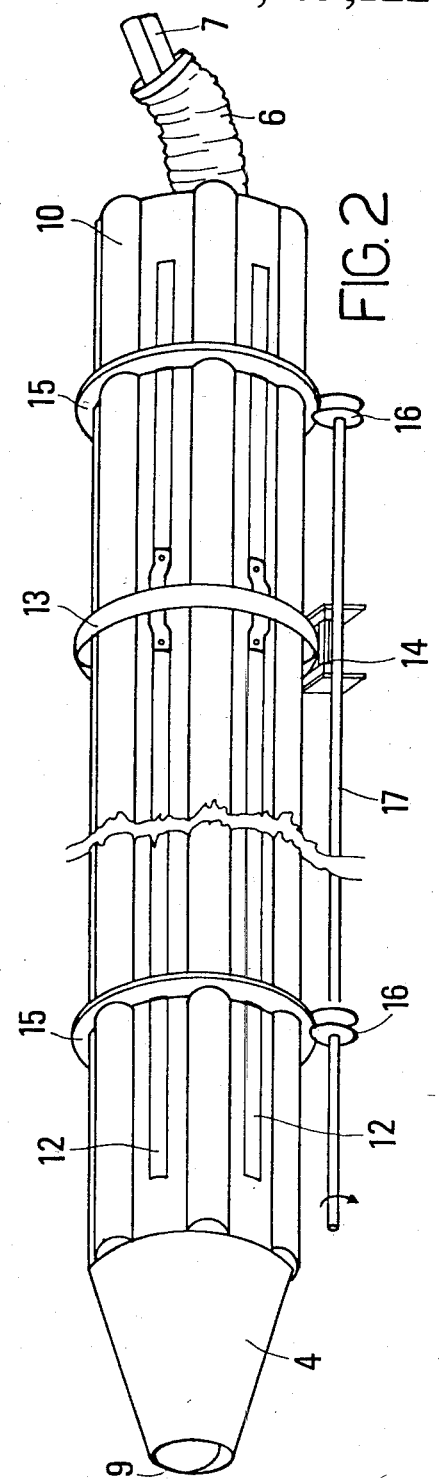

CONTINUOUS-CYCLE ELECTROPLATING PLANT

BACKGROUND OF THE INVENTION

This invention relates to a continuous-cycle electroplating plant.

Electroplating plants, e.g. for small metal items, which include one or more lines of tanks designed to contain treatment liquids (such as solvents, dissolved acids, degreasing agents, neutralizing agents, and the like) and transversely arranged one after another between two slide guides, are known in the art. An overhead crane structure is usually mounted movable along the slide, guides to shift, immerse, lift and rotate in succession plurality of transportable tumblers (usually consisting of a plastics material, such as propylene) into and out of the tanks in accordance with a desired sequence of operation steps. A complete electroplating cycle requires one or more tanks specifically designed to be used for one of the following wet preparation or cleaning steps of the metal material to be treated, namely pre-degreasing, pickling, degreasing, and neutralizing, and one or more specific tanks for electroplating proper as well as one or more tank for passivating or coloring the electroplated material.

Although quite satisfactory in various respects, such plants have a number of disadvantages which adversely affect their productivity and efficiency. Thus, for example, prior plants cannot be operated on a continuous basis, as the various tumblers must dwell for specific time intervals in the various tanks, which results in a large amount of time being wasted for transferring the various tumblers from one tank to the other and in the need of using complex and costly apparatuses for handling and monitoring each tumbler. Moreover, prior plants require large amounts of treatment liquids in the tanks. Such liquids require frequent purification through suitable apparatus. Large amounts of liquid in the electroplating tanks affect migration and deposition rate of the plating metal ions as the latter have to follow long paths before reaching the material to be planted. In addition electroplating plants cannot be fully automated at acceptable costs, and thus they must be installed indoors to protect operators against inclement weather, which requires, in turn, availability of special arrangements and depuration systems to prevent environmental pollution.

SUMMARY OF THE INVENTION

It is an object of this invention to provide a continuous-cycle electroplating plant which can effectively reduce the deposition time of plating metals over prior plants.

Another object of this invention is that such an electroplating plant be suitable for fully automated operation, and accordingly for outdoor installation, at competitive costs.

A further object of this invention is to make it possible for the material to be plated to be prepared or cleaned by ultrasonic treatment rather than by chemical methods.

Still another object of the invention is that such an electroplating plant be relatively easy to produce and require minimum maintenance.

These and other objects which will be further illustrated hereinafter, can be achieved by a continuous-cycle electroplating plant, according to the invention, for plating loose metal items, the plant including a multiplicity of sequentially arranged processing units which comprise at least one pre-treating unit, at least one electroplating units and at least one passivating or coloring unit, and being characterized in that each processing unit has a barrel mounted for rotation on a support structure, a spiral rigid with, and extending along and around, the inner side wall of the barrel, thereby acting, in use, as a spiral conveyor or moving the metal items from an inlet end of the barrel to its outlet end, and treating means for processing the metal items while being moved in the barrel.

BRIEF DESCRIPTION OF THE DRAWINGS

Further aspects and advantages of this invention will be more readily understood from the following detailed description of some preferred, though not exclusive, embodiments thereof, given by way of example only with reference to the accompanying drawings, where:

FIG. 1 is a longitudinal axial section view taken through an electroplating drum according to the invention;

FIG. 2 is a perspective view of the drum of FIG. 1;

DESCRIPTION OF THE PREFERRED EMBODIMENTS

Figure 4:
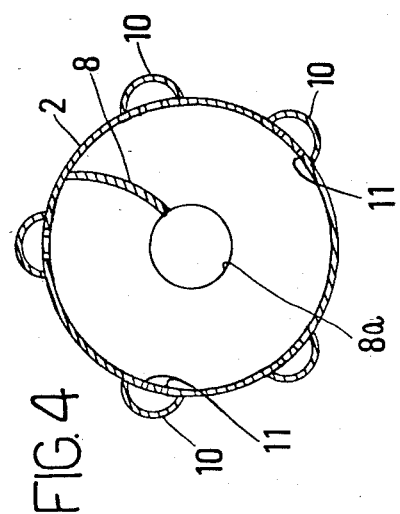
FIG. 4 is a section view taken along the line IV—IV of FIG. 3.

With reference to FIGS. 1 to 6, an electroplating unit 1 comprises a horizontal tubular body or barrel 2 having an inlet end 3 and an outlet end 4. The inlet end 3 includes an end plate or base formed with a central opening 5 into which an outer flexible conduit 6 opens. The flexible conduit 6 is arranged to receive loose metal material to be plated from a chute 7 fixed to a supporting framework, not shown. The interior of the barrel 2 is provided with a partition wall 8 in the form of an uninterrupted spiral or helix which extends from the end 3 to the end 4. The latter tapers and has a central discharge opening 9 which is preferably identical and coaxial with the opening 5. The helix 8 centrally delimits an interrupted axial opening 8a (FIG. 4) approximately similar in size and coaxial with the openings 5 and 9.

Figure 3:
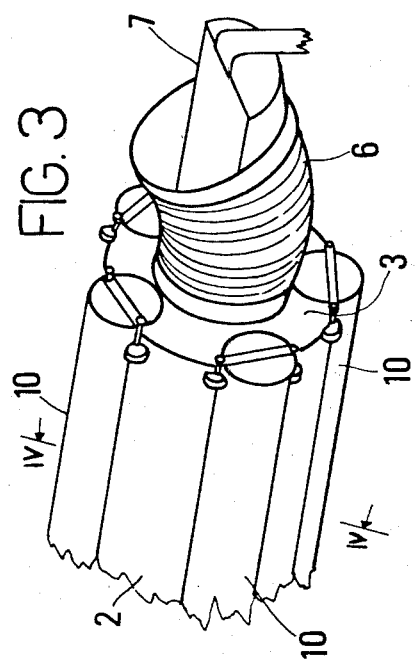
FIG. 3 is a perspective view of the inlet end of the drum shown in FIGS. 1 and 2.

Formed on the exterior of the barrel 2 are a plurality of longitudinal seats 10 (five in number, in the example shown), each comprising e.g. one half of a tube longitudinally split into two halves and attached, such as by welding or glueing, to the external surface of the barrel 2. At the outlet end 4, the seats 10 can be made blind, whereas at the inlet end 3 they can be closed with a stopper (FIG. 3). Those areas of the tubular body 2 which are covered by the tubular seats 10 are formed with a plurality of perforations 11 so as to establish direct liquid communication between the barrel interior and the interior of the seats. An electrically conductive rod 12, e.g. of copper, is provided at the longitudinal wall sections of the body 2 between any two successive seats 10. The rods 12 are electrically connected to a ring 13 which is electrically connected, e.g. by means of sliding contacts generally indicated at 14, to the negative pole of a d.c. current supply (not shown). Similarly, within the seats 10 an electrically conductive bar (not shown) is provided, the bars in the various seats 10 being all electrically connected, such as through a ring (not shown) similar to the ring 13, to the positive pole of the d.c. current supply. The barrel 2 is rotatably supported, e.g. through bearing rings 15 which rest on small bearing rollers 16. At least some of the rollers 16 are driving rollers in that they are keyed to a drive shaft 17, which is in turn driven, in use, by a power drive unit (not shown), for example, including a geared motor.

Inside the barrel 2 there is provided an amount of a galvanization electrolyte sufficient to fill the bottom portion of the barrel and, in any case, reaching a level not higher than that of the openings 5 and 9. It will be seen that, in use, metal items to be plated are fed into the barrel 2 through the chute 7 and the flexible hose 6. The material falls and is immersed in the liquid contained in the barrel. Owing to rotation of the barrel and the presence of the inner spiral or helix 8, the material is caused to move progressively along the drum bottom and is finally discharged through the opening 9. Along said path, the material is permanently held close to the plating metal which can be in the form of balls or bars housed in the various seats 10 and in electric contact with the positive pole of the current supply. More specifically, the material to be plated is held adjacent to at least one of the seats 10, namely to that one which, at a given position of the rotating barrel, happens to be at the lowest level. Closeness to the anodic zone (plating metal) and to the cathodic zone (items being plated) is an important factor in view of obtaining a considerable reduction in electrodeposition times owing to the fact that all ionic migration paths are drastically shortened, which results in an increased hourly output of the plant or system. Furthermore, the provision of a short distance between plating metal and material being plated makes it possible to use of limited amounts of electrolyte in the barrel. Moreover, the material being plated is continuously moved throughout the galvanic treatment, and thus its entire surface is exposed directly to the galvanizing action of the electrolytic bath. The bath itself (not shown in the drawings) is also constantly stirred owing both to the mechanical action of the spiral or helix 8 and to its being forced to cyclically flow through the perforations 11, to enter one or more seats 10 as they move downwards during the barrel rotation and its being gradually discharged from one or more seats 10 as they move upwards. All these favourable factors promote uniform electrodeposition of a plating coating onto the metal items being plated, and makes it possible to operate, in general, at a significantly reduced amperage in the d.c. current supply.

Of course, the length of time the material to be plated remains in the barrel 2 will depend on, and will vary with, the speed of rotation of the drum and the pitch of the helix 8.

The plant can also comprise units (not shown) for carrying out generally required pre-treatment operations, such as one or more cleaning, degreasing, pickling and neutralizing units, each having a barrel similar to barrel 2 and being provided with a respective helix 8 but having no seats 10, perforations 11, rods 12 and related electric connections. Such units are designed to contain a specific treatment liquid, loaded continuously or intermittently from their end 3 with loose metal items to be processed, which are then immersed in the treatment liquid, tumbled, moved by the helix 8 throughout the barrel and discharged at the outlet end 4 thereof. Cleaning barrels may be arranged one after another in mutual longitudinal alignment upstream of one or more electroplating barrels. Furthermore, the various barrels can be driven by the same source of motion provided for the electroplating barrel or barrels.

Figure 5:
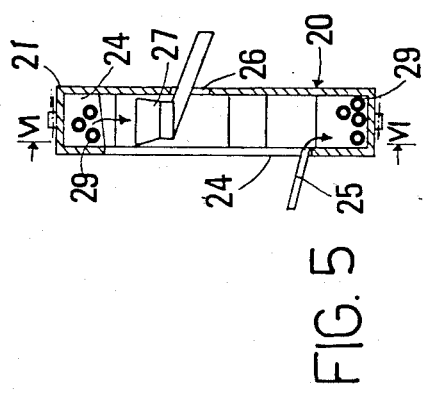
FIG. 5 is a sectional view, taken along the line V—V of FIG. 6, of a lifting apparatus.
Figure 6:
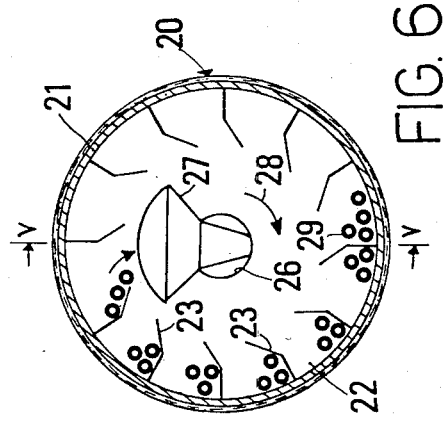
FIG. 6 is a section view taken along the line VI—VI of FIG. 5.

Between the cleaning barrels, or between one cleaning barrel and an electroplating barrel, a lifting apparatus 20, such that shown in FIGS. 5 and 6, can be provided in order to lift the metal items discharged from a barrel to a higher level to be fed to a successive processing unit. The lifting device 20 comprises a hollow cylindrical body or drum 21 having a multiplicity of inner peripheral segments 22 separated from each other by radially extending partitions 23. The cylindrical body 21 has a wide inlet opening 24, through which a loading chute 25 extends, and an outlet opening 26, through which the discharge end of a stationary hopper or chute 27 located inside the cylindrical body 21 projects. The cylindrical body 21 is mounted for rotation about its longitudinal horizontal axis on a suitable supporting structure (not shown). When the cylindrical body 21 rotates in the direction of the arrow 28 (FIG. 6), loose metal items 29 previously discharged therein from the chute 25 is lifted and conveyed into the hopper 27 which, in turn, will feed it outside at a higher level than that of the chute 25.

The plant illustrated in FIGS. 1 to 6 is susceptible to many modifications and changes. Thus, for example, each electroplating barrel can be equipped with a set of safety valves (e.g. weight-operated valves) for venting gases released during the galvanic process. Furthermore, both on the electroplating barrels and cleaning barrels upstream of the electroplating barrels, as well as on any passivating barrels downstream of the electroplating barrels, there may be provided pumping arrangements for recycling treatment liquids or electrolytic baths.

Figure 7:
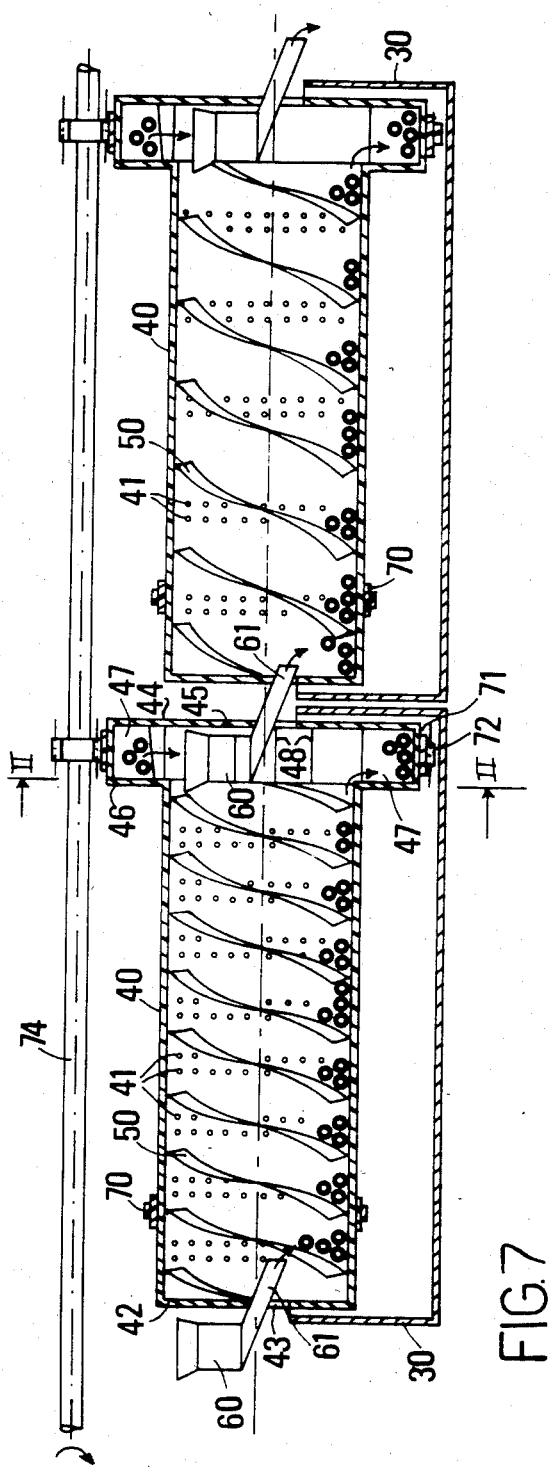
FIG. 7 is a diagrammatic partial view showing a continuous-cycle electroplating plant in a longitudinal axial section.
Figure 8:
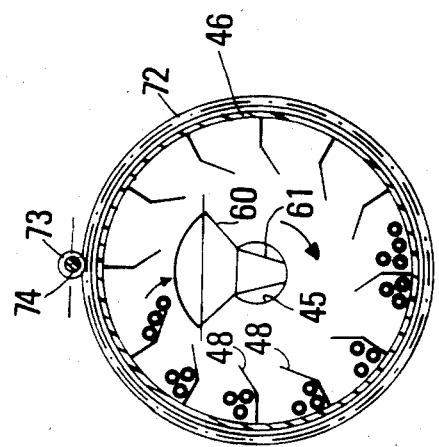
FIG. 8 is a schematic section view taken along line II—II in FIG. 1.

The electroplating plant shown in FIGS. 7 and 8 comprises a plurality of sequentially arranged units each one including a tank 30 designed to contain a specific treatment liquid, such as a solvent, acidic solution, degreasing solution, or neutralizing solution.

Above each tank 30 a respective conveying barrel or tumbler 40 has its sidewall formed with a plurality of small through holes 41. The various barrels 40 are axially aligned one with respect to the other and arranged in an orderly succession and partially immersed (e.g. by one third) in the treatment liquid contained in the underlying tank 30. Each barrel 40 has an upstream end 42 provided with an axial central inlet opening 43 and a downstream end 44 provided with an axial central outlet opening 45. At the downstream end of each drum there is formed an annular enlarged portion or drum 46 having segments or compartments 47 delimited by radially extending shaped partitions 48. The drum 46 is similar in structure to the lifting apparatus 20.

A spiral or helix 50 is provided along the inner wall of the barrels 40 and can have a pitch that can differ from one barrel to another.

A discharge mouth 61 of a conveying and feed-in chute or hopper 60 extends through the inlet opening 43 at the upstream end 42 of each barrel. The feed-in hopper 60 for each barrel 40 arranged downstream of the first one is accommodated within the enlarged portion 46 of the immediately preceding barrel.

Each barrel 40 is mounted for rotation, e.g. by means of suitable rolling supports not shown, on an encircling ring, generally indicated at 70, located in the vicinity of the upstream end 42, and on a ring 71 surrounding the enlarged portion 46. The ring 71 also supports a ring gear 72 which can mesh engage with a respective pinion gear 73 rigid in rotation with a drive shaft 74 common to all the barrels 40 and driven by a motor not shown.

Each processing unit operates as follows. Loose metal items is fed by gravity through the hopper 60 upstream of a barrel 40, as the latter is being rotated, and moved forward by the spiral 50 towards the downstream end where it is discharged into the compartment 47 within the enlarged portion 46. While travelling through the barrel, the material is immersed in the treatment liquid which can readily enter the drum through the holes 61 formed in its walls. Once inside the enlarged portion 46, the treated material is lifted by the partitions 48 and discharged into the downstream hopper 40, to be transferred into the next barrel or removed from the plant.

The residence time of the material being treated in the bath can be varied in many ways, such as, other things being equal, by changing the barrel speed of rotation or the pitch of the respective spiral 50 or by providing barrels of different length for the various treatments.

Of course, the tanks 30 will be equipped with the required accessories for supplying, recycling and draining the treatment baths. Furthermore, the electroplating tank(s) can be provided with suitable electric connections both for the material to be electroplated acting as the cathode and for the plating metal acting as the anode. A plant as described above can be operated in a continuous and fully automated fashion. In the electroplating tank(s) 30, the material to be plated is held at a short distance from the anode(s). Thus a reduce deposition time for the plating metal and a decreased amperage in the d.c. current supply are required, as mentioned above.

One or more barrels 40 can be used in a drying unit, in which case, the tank 30 is replaced by a source of heat (such as streams of hot air) for drying the material inside the drum before being plated. If a pre-treating processing barrel is made of metal, e.g. steel, cleaning of the items to be plated can include ultrasonic treatment.

The materials and dimensions can vary according to specific requirements. Advantageously, for most of the barrels, drums, spiral flanges, and chutes or hoppers, plastics materials are presently preferred as being adequately resistant to both chemical attack and wear.

We claim:

1. A continuous-cycle electroplating plant for plating loose metal items, the plant including a d.c. current supply and at least one processing unit comprising
   a barrel mounted for rotation on support structure,
   a spiral rigid with, and extending along and around, the inner sidewall of the barrel, thereby acting, in use, as a spiral conveyor for moving the metal items from an inlet end of the barrel to its outlet end,
   a plurality of longitudinal peripheral seats in communication with the barrel interior,
   pieces or rods of a plating metal accommodated in said seats and in electric contact with one pole of the said current supply, and
   a liquid electrolyte contained in the said barrel and in electric contact with the other pole of the said current supply.

2. A plant as claimed in claim 1, wherein said seats are angularly spaced on the barrel outer wall and in communication with the barrel interior through perforations formed in the barrel wall.

3. A plant as claimed in claim 1, wherein the or each processing unit has a loading end formed with the axial inlet opening for the metal items to be treated and a tapering discharge end which is formed with an outlet opening for the treated metal items, and in which a tapering end of the spiral extends.

* * * * *